(12) United States Patent
Shimizu et al.

(10) Patent No.: US 7,373,034 B2
(45) Date of Patent: May 13, 2008

(54) OPTOELECTRONIC HYBRID INTEGRATED MODULE

(75) Inventors: Takanori Shimizu, Tokyo (JP); Kazuhiko Kurata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/661,802

(22) PCT Filed: Sep. 2, 2005

(86) PCT No.: PCT/JP2005/016105

§ 371 (c)(1), (2), (4) Date: Mar. 1, 2007

(87) PCT Pub. No.: WO2006/025523

PCT Pub. Date: Mar. 9, 2006

(65) Prior Publication Data

US 2007/0263957 A1 Nov. 15, 2007

(30) Foreign Application Priority Data

Sep. 2, 2004 (JP) ............................. 2004-255093

(51) Int. Cl.
*G02B 6/00* (2006.01)
(52) U.S. Cl. ....................................................... 385/14
(58) Field of Classification Search ................. 385/14, 385/39, 49, 50
See application file for complete search history.

(56) References Cited

U.S. PATENT DOCUMENTS 6,735,366 B2    5/2004    Goto

FOREIGN PATENT DOCUMENTS

| JP | 2000-298217 A | 10/2000 |
| JP | 2000-340957 A | 12/2000 |
| JP | 2001-004864 A | 1/2001 |
| JP | 2001-174675 A | 6/2001 |
| JP | 2001-196494 A | 7/2001 |
| JP | 2001-249241 A | 9/2001 |

*Primary Examiner*—Quyen P Leung
(74) *Attorney, Agent, or Firm*—Foley & Lardner LLP

(57) ABSTRACT

In an optoelectronic hybrid integrated module, an insulating layer 31 is overlaid on a substrate 3, an insulating layer 2 containing an optical waveguide 21 is formed on the insulating layer 31, a lower ground electrode 61, an upper ground electrode 62, conductive vias 71, and the like are electrically connected on and under the insulating layer 2, and the optical waveguide 21 is coupled with a transmitting portion 11 mainly composed of a light emitting device and a transmitting LSI and with a receiving portion mainly composed of a light receiving device and a receiving LSI. Signal light for driving the light emitting device in the transmitting portion 11 is coupled with the optical waveguide 21 and optically transmitted. Although stray light 41 which is not incident on the optical waveguide 21 is transmitted in the insides of the substrate 3 and the insulating layer 2 or in a space together with electromagnetic noise 42, they are scattered by the conductive vias 71 and reflected by the upper and lower ground electrodes 61, 62, thereby only signal light is coupled with the light receiving device of the receiving portion 12.

23 Claims, 5 Drawing Sheets

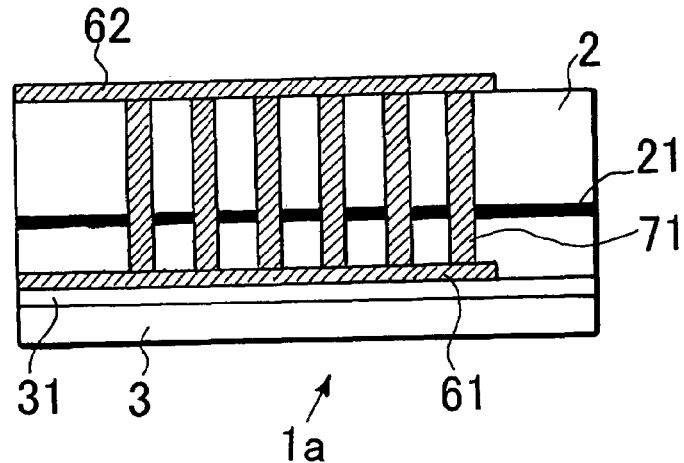
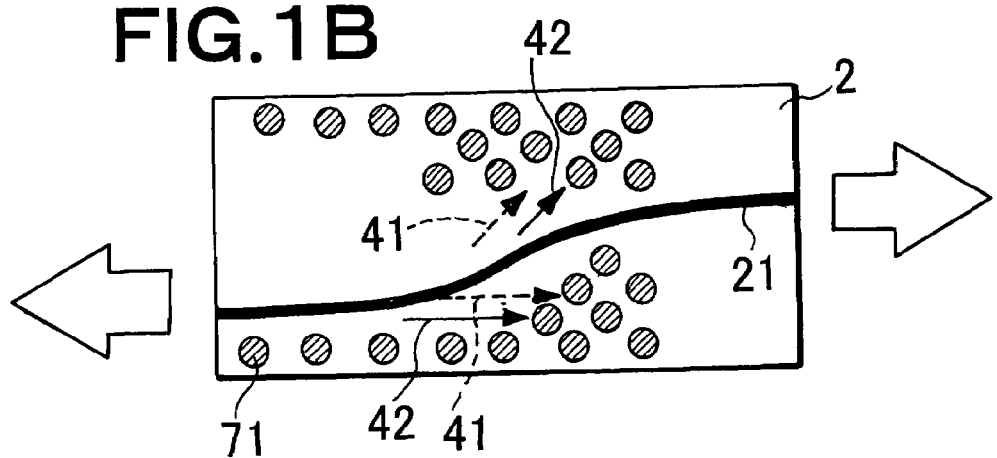
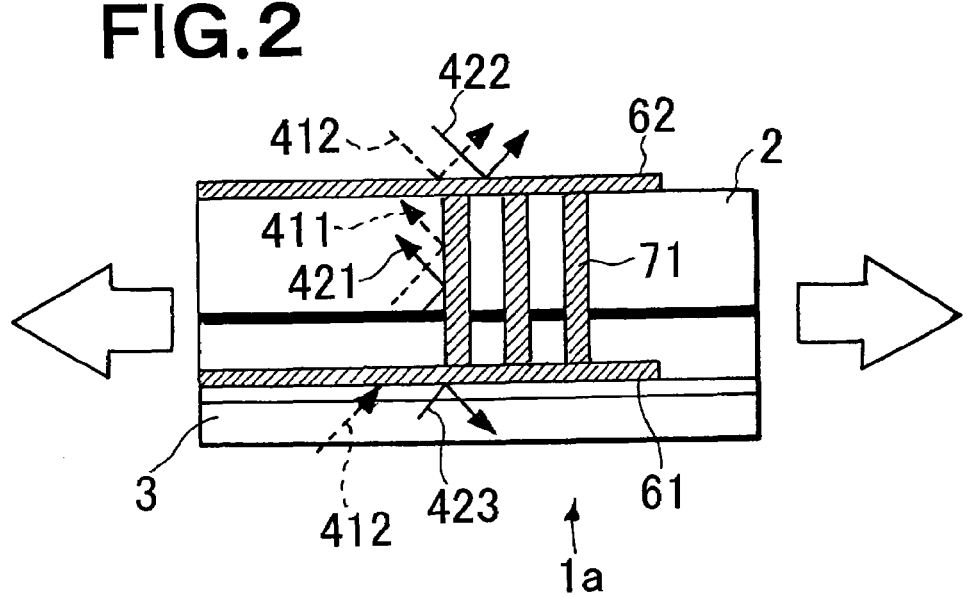

OPTOELECTRONIC HYBRID INTEGRATED MODULE

TECHNICAL FIELD

The present invention relates to an optoelectronic hybrid integrated module, and more particularly to a high speed optoelectronic hybrid integrated module on which a light emitting device, its drive LSI, a light receiving device, its signal processing LSI, and the like are integrally mounted together with an optical waveguide.

BACKGROUND ART

Recently, it is expected to realize a high speed, less expensive, and small optical transceiver which is used in optical communications represented by local area networks, metropolitan area networks, and the like as well as used in optical links in and between servers and routers. The optical transceiver is composed of a light transmitting portion and a light receiving portion, in which a module of the light transmitting portion has a transmitting LSI and a light emitting device such as a semiconductor laser and the like, and a module of the light receiving portion has a receiving LSI and a light receiving device such as a photodiode.

Heretofore, in this type of optoelectronic hybrid integrated modules, a light coupling system is formed by mounting an optical device on a substrate on which an optical waveguide is formed and coupling it with the optical waveguide, and light is input from and output to the outside by coupling an end of the optical waveguide with an optical fiber. Further, to compose input/output fibers of a single fiber, an access network employs a structure for discriminating the signal wavelengths of a light emitting device and a light receiving device and sorting the wavelengths by inserting an optical filter in a midway. Then, in a transmission/reception integral type optical module, since it is necessary to suppress stray light and electromagnetic wave noise, various reduction means are conventionally employed. For example, a conventional light transmitting module disclosed in Japanese Patent Application Laid-Open No. 2001-249241 (pages 3-4, FIGS. 1 and 2) employs such a structure that a light shield plate having a hole is inserted into an optical waveguide between a light emitting device and a light receiving device so that light passes in the vicinity of the light emitting device and is shielded on the outside of it to thereby suppress stray light which is not coupled with the optical waveguide from the light emitting device.

Further, as another structure capable of suppressing stray light, Japanese Patent Application Laid-Open No. 2001-174675 (page 3, FIGS. 1 and 2), for example, proposes a structure arranged such that the peripheries of a light emitting device and a light receiving device are covered with a transparent resin in a dome state, and the outsides of them are coated with light shield resin covering portions. According to the structure, stray light can be prevented from being leaked to the outside as well as the light from the outside is prevented from being received by the light receiving device.

In contrast, as a structure for suppressing electromagnetic wave noise, there are employed a countermeasure of increasing a distance between a transmitting portion and a receiving portion to prevent electromagnetic wave noise caused by driving a light emitting device from reaching a receiving side and being amplified by a receiving LSI, and a countermeasure of covering an overall substrate, on which a device of a receiving portion, for example, is mounted, with an electromagnetic wave shielding module package.

DISCLOSURE OF THE INVENTION

In an optical module using a conventional optical waveguide substrate, a countermeasure is employed to each of individual parts to suppress stray light and electromagnetic wave noise. However, the countermeasures applied to the individual parts prevent reduction of a size and a cost because it is difficult to reduce the number of parts.

Further, when the light shield plate is inserted to reduce stray light, strict alignment accuracy is required to adjust the light shield plate so that the hole portion thereof accurately comes to the waveguide portion, from which a problem arises in that a mounting cost increases.

Further, when the distance between the light emitting device and the light receiving device is increased to reduce the electromagnetic wave noise, a problem arises in that reduction in size is prevented.

Further, in the conventional structure, since an electromagnetic shield structure cannot be formed in a minute portion, when a transmitting portion, a receiving portion, and the like are composed of arrays, it is difficult to suppress crosstalk between adjacent channels.

A subject of the present invention is to solve the problems of the conventional art described above, wherein objects of the present invention are, first, to provide an optoelectronic hybrid integrated module in which stray light and electromagnetic wave noise can be suppressed in the same part in place of individual parts (on the same substrate), second, to provide an optoelectronic hybrid integrated module having a structure capable of suppressing stray light without using a part such as a light shield plate and reducing a mounting cost, third, to provide an optoelectronic hybrid integrated module having a structure capable of reducing the electromagnetic wave noise even if a light emitting device is disposed near to a light receiving device and reducing a size, and, fourth, to provide an arrayed optoelectronic hybrid integrated module in which crosstalk is suppressed.

To achieve the objects described above, there is provided according to the present invention an optoelectronic hybrid integrated module including a transmitting portion and/or a receiving portion and an optical waveguide disposed in an insulating layer and optically coupled with at least the transmitting portion or the receiving portion, wherein the optoelectronic hybrid integrated module is characterized in that at least a part of the optical waveguide is surrounded by a conductive member that is formed cylindrically and grounded.

Further, to achieve the objects described above, there is provided according to the present invention an optoelectronic hybrid integrated module including a transmitting portion and/or a receiving portion and an optical waveguide disposed in an insulating layer and optically coupled with at least the transmitting portion or the receiving portion, wherein the optoelectronic hybrid integrated module is characterized in that an upper ground electrode and a lower ground electrode are formed on the upper and lower surfaces of the insulating layer, and at least a part of the optical waveguide is surrounded in a C-shape or a square shape by parallel conductive members connected to at least one of the upper ground electrode and the lower ground electrode and formed on both the sides of the optical waveguide and along it and by intersecting conductive members formed in a direction in which they intersect the parallel conductive members.

Effect of the Invention

The present invention is arranged such that the insulating layer having the optical waveguide therein is disposed on a substrate, conductive films (ground patterns, signal wirings, and power supply wirings) formed on the upper surface and the lower surface of the insulating layer are effectively used as a light shield film and an electromagnetic wave shield film as well as the optical waveguide is surrounded by conductive members disposed in the insulating layer and grounded in a C-shape or a square shape so that they carry out light shield and electromagnetic wave shield actions. According to the present invention, light and electromagnetic wave can be shielded in the same part (on the same substrate) in place of separate parts, further it is not necessary to increase the distance between the transmitting portion and the receiving portion, thereby the number of parts can be reduced as well as the size and the cost of the optoelectronic hybrid integrated module can be reduced. Since a light shield plate having an opening for reducing stray light becomes unnecessary, a mounting cost can be suppressed. Further, since an electromagnetic shield structure can be made in a minute portion, when the respective parts are composed of arrays, crosstalk between adjacent channels can be suppressed.

BRIEF DESCRIPTION OF THE DRAWINGS

Parts (a) and (b) of FIG. 1 are a longitudinal sectional view and a lateral cross sectional view showing a main portion of a first embodiment of the present invention;

FIG. 2 is a schematic view explaining operation of the first embodiment of the present invention;

Figure 3A:
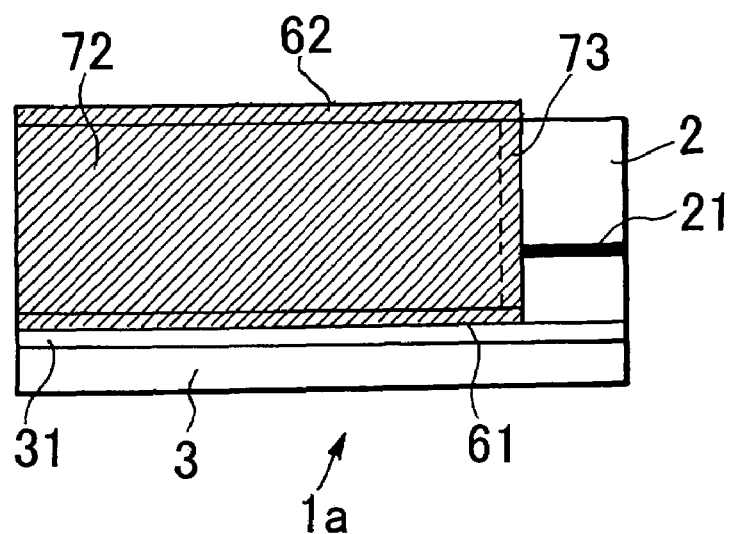
Figure 3B:
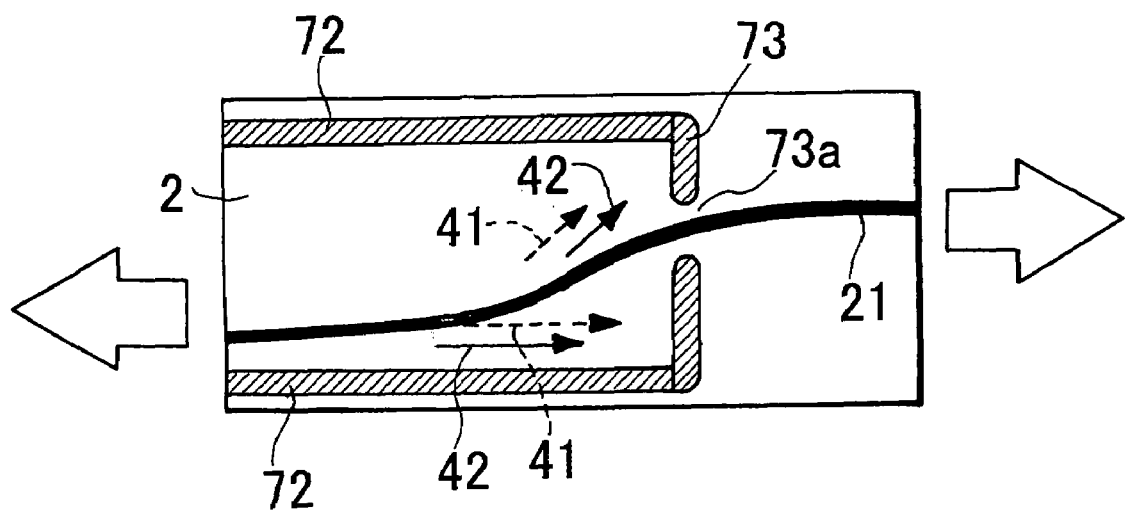
Figure 4A:
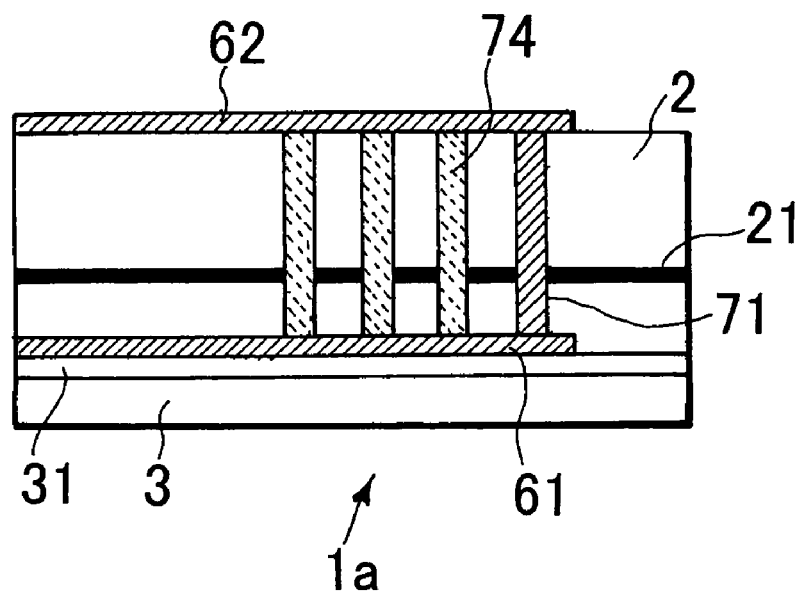
Figure 4B:
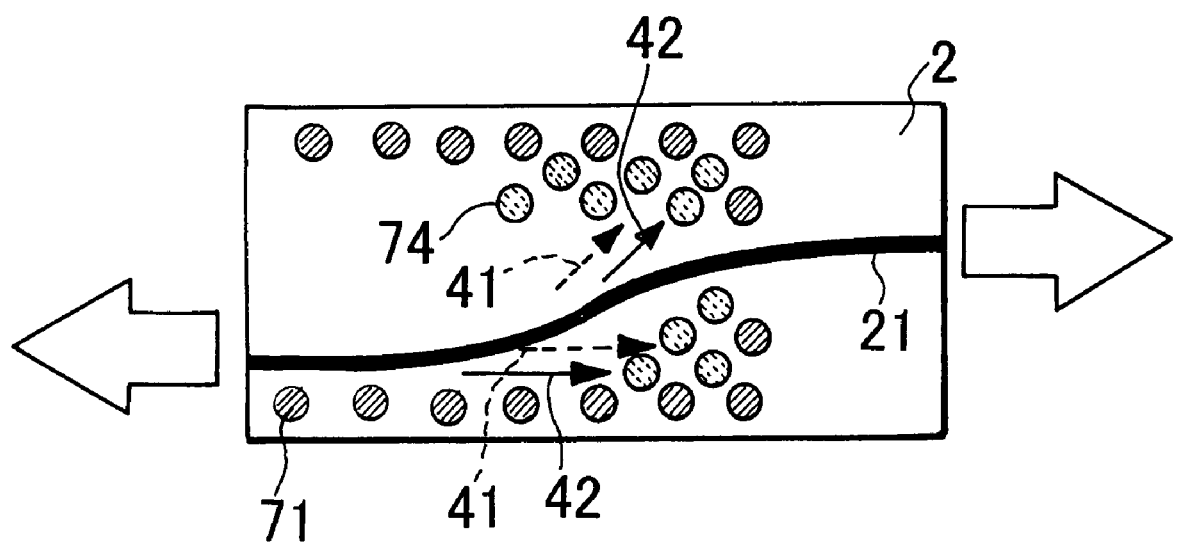
Figure 5A:
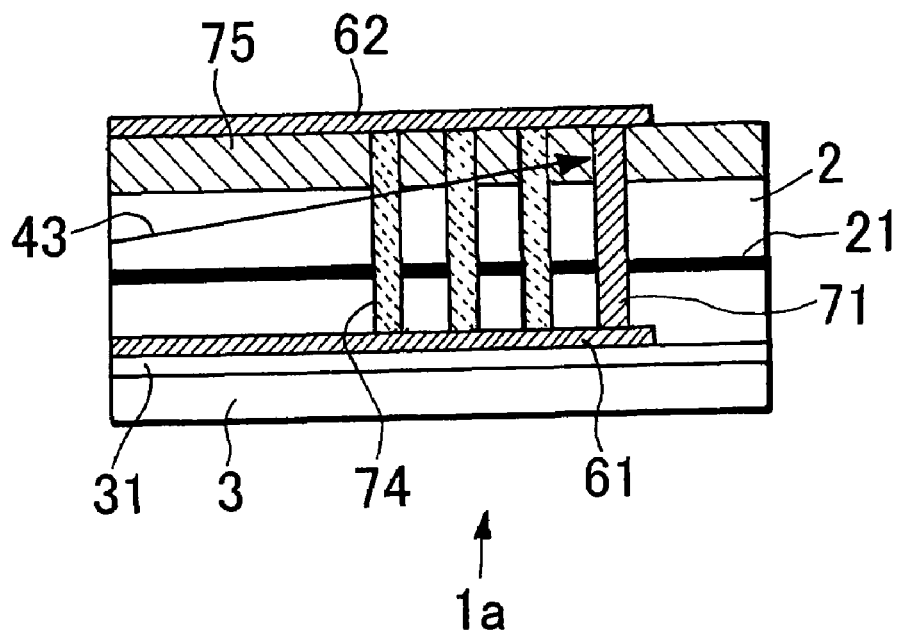
Figure 5B:
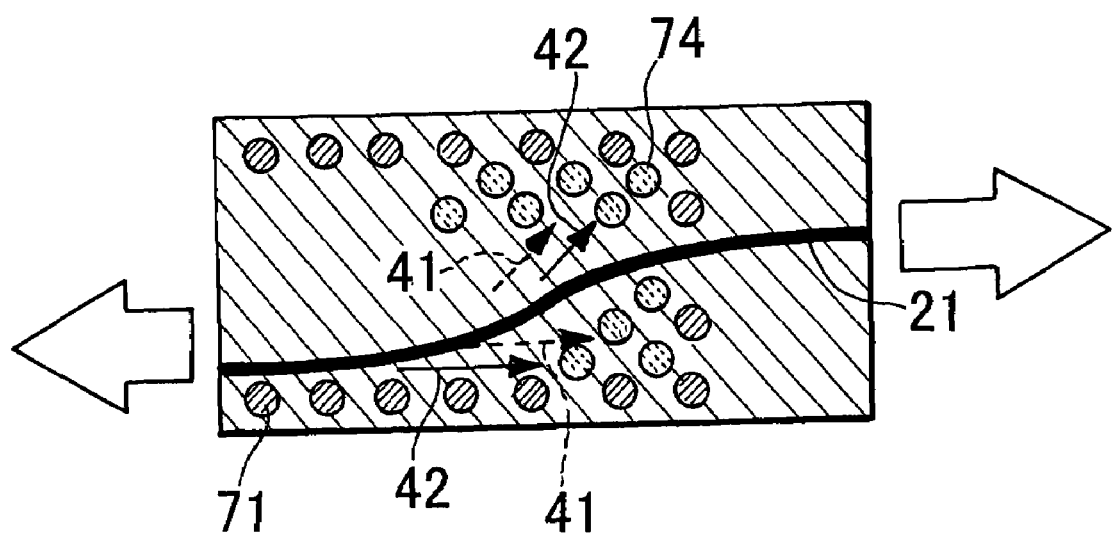
Figure 6A:
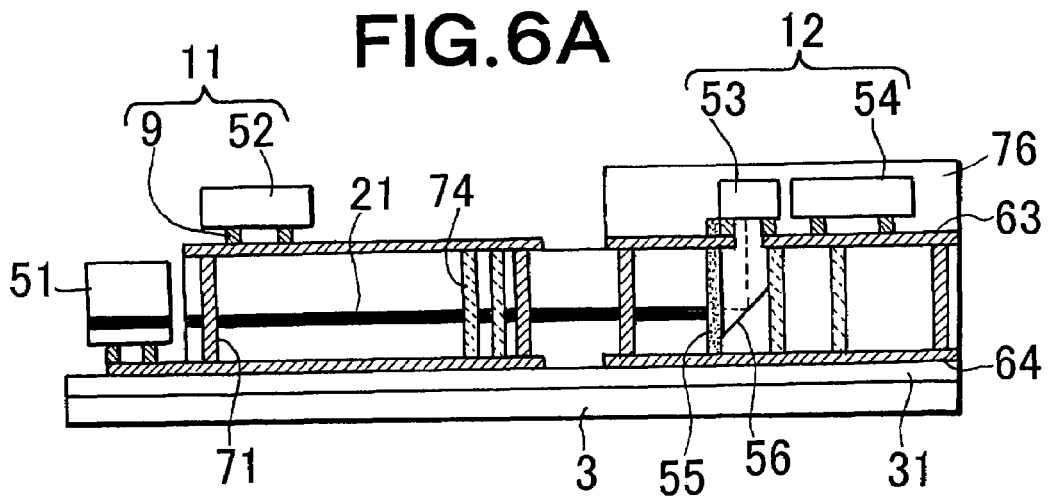
Figure 6B:
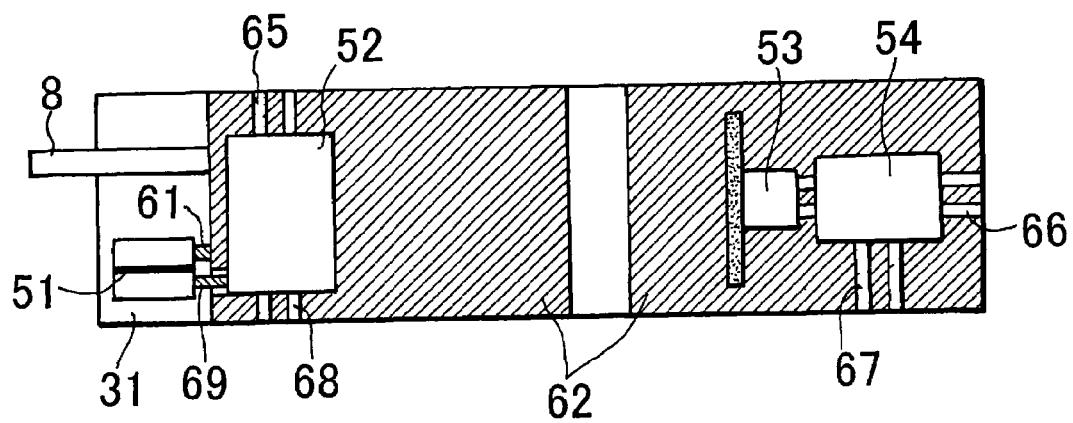
Figure 6C:
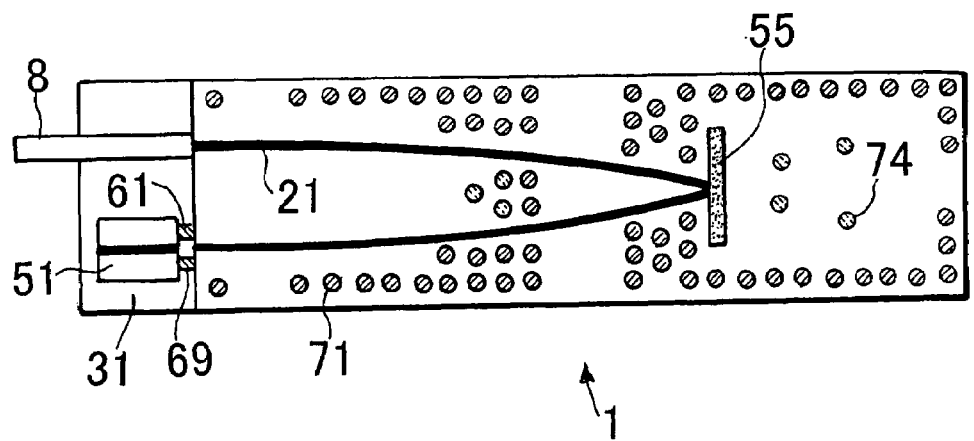

Parts (a) and (b) of FIG. 3 are a longitudinal sectional view and a lateral cross sectional view showing a main portion a second embodiment of the present invention;

Parts (a) and (b) of FIG. 4 are a longitudinal sectional view and a lateral cross sectional view showing a main portion of a third embodiment of the present invention;

Parts (a) and (b) of FIG. 5 are a longitudinal sectional view and a lateral cross sectional view showing a main portion of a fourth embodiment of the present invention; and Parts (a) to (c) of FIG. 6 are a longitudinal sectional view, a top view, and a lateral cross sectional view of a fifth embodiment of the present invention.

REFERENCE NUMERALS 1 optoelectronic hybrid integrated module
1 an optically guiding portion of optoelectronic hybrid integrated module
2 insulating layer
3 substrate
8 optical fiber
9 bump
11 transmitting portion
12 receiving portion
21 optical waveguide
31 insulating layer
41, 43 stray light
411 stray light in insulating layer
412 space-transmitting stray light
42 electromagnetic wave noise
421 insulating-layer-transmitting electromagnetic wave noise
422 space-transmitting electromagnetic wave noise
423 substrate-transmitting electromagnetic wave noise
51 LD
52 transmitting LSI
53 receiving PD
54 receiving LSI
55 WDM filter
56 mirror
61 lower ground electrode
62 upper ground electrode
63 upper electrode/wiring
64 lower electrode/wiring
65, 66, 69 signal line
67, 68 power supply line
71 conductive via (via hole filled with conductive material)
72 conductive side wall
73 conductive front wall
73a opening
74 absorbent-filled via (via hole filled with light absorbing material)
75 absorbing layer
76 shield case

BEST MODE FOR CARRYING OUT THE INVENTION

Next, embodiments of the present invention will be described with reference to the drawings. Parts (a) and (b) of FIG. 1 are sectional views of a main portion of a first embodiment of the present invention paying attention particularly to an electromagnetic and light shield structures of an optical waveguide, wherein the part (a) is a longitudinal sectional view, and the part (b) is a lateral cross sectional view on a plane passing through an optical waveguide. In an optically guiding portion 1a of an optoelectronic hybrid integrated module of the embodiment shown in FIG. 1, an insulating layer 31 is overlaid on a substrate 3 composed of Si, and an insulating layer 2 having the optical waveguide 21 disposed therein is formed thereon. Then, an upper ground electrode 62 and a lower ground electrode 61 are formed on the upper and lower surfaces of the insulating layer 2, respectively, and a plurality of via holes 71 filled with a conductive material and connected to the upper and the lower ground electrode 62, 61 (hereinafter, referred to as conductive vias) are formed in the insulating layer 2. The optical waveguide 21 is optically coupled with a transmitting portion 11a, which is mainly composed of a light emitting device and a transmitting LSI, and with a receiving portion 12 mainly composed of a light receiving device and a receiving LSI.

The insulating layer 2 has the optical waveguide 21 disposed therein and a refraction index structure suitable for guiding light. A material of the insulating layer is preferably a polymer resin which has a low loss to a signal wavelength and can carry out processing and the like of the via holes by a laser beam.

In the embodiment, the conductive vias 71 are disposed on the transmitting portion side so as to surround the optical waveguide 21. The conductive vias 71 are disposed as near as possible to the optical waveguide 21 in the range in which the signal light transmitted in the optical waveguide 21 between the transmitting portion and the receiving portion is neither absorbed nor scattered as well as in a direction vertical to the main transmitting direction of stray light 41 (right/left direction in the figure). It is effective to dispose a plurality of trains of the conductive vias 71 in the vertical direction zigzag with respect to the main transmitting direction of the stray light 41 so that the stray light 41 is prevented from linearly traveling toward the receiving portion 12 (right direction in the figure). The first embodiment shown in FIG.

1 shows a structure in which the stray light 41 and electromagnetic wave noise 42 from the transmission side do not leak to the outside. However, it is also possible to employ a structure in which the conductive vias 71 are disposed on the receiving portion 12 side so that stray light and electromagnetic wave noise from the outside do not linearly travel to the receiving portion. There may be also employed a structure in which the optical waveguide is surrounded by the conductive vias 71 on both the transmitting portion side and the receiving portion side.

Next, operation of the optoelectronic hybrid integrated module of the embodiment will be explained referring to FIG. 2.

When the light emitting device is driven in the transmitting portion 11, the signal light is incident on the optical waveguide 21 and optically transmitted. However, in the stray light 41 which is not incident on the optical waveguide 21, stray light 411 in the insulating layer 2 that transmits therein is scattered by the conductive vias 71 together with space-transmitting electromagnetic wave noise 421 that transmits in a space. Further, the space-transmitting stray light 412 traveling in the space is reflected on the upper ground electrode 62 together with space-transmitting electromagnetic wave noise 422. Further, substrate-transmitting electromagnetic wave noise 423 transmitting in the substrate 3 is reflected by the lower ground electrode 61, the space-transmitting the stray light 412 incident on the substrate 3 composed of Si is almost absorbed by the substrate, and the remaining portion thereof is reflected by the lower ground electrode 61. Accordingly, the stray light is not coupled with the light receiving device of the light receiving portion, and only received signal light is coupled with the light receiving device of the receiving portion 12.

As described above, in the optoelectronic hybrid integrated module of the embodiment, since the trains of the conductive vias for shielding light and electromagnetic noise can be formed on the substrate in which the optical waveguide passes in the optically guiding portion 1a thereof, the structure of the overall module can be simplified and the number of parts can be reduced, thereby the size and the cost of the module can be reduced. Further, since the shut-off structure can be made on the substrate and in the insulating layer, it is possible to enhance a light and electromagnetic noise shield effect by removing the stray light and the electromagnetic wave noise in the substrate and the insulating layer transmitted from a transmission side to a reception side.

Parts (a) and (b) of FIG. 3 are cross sectional views of a main portion of a second embodiment of the present invention, wherein the part (a) is a longitudinal sectional view, and a part (b) is a lateral cross sectional view on a plane passing through an optical waveguide. In an optically guiding portion 1a of an optoelectronic hybrid integrated module of the embodiment shown in FIG. 3, a light and electromagnetic wave shield effect is enhanced by forming a wall-like member completely filled with a conductive material in place of the conductive vias. That is, a pair of conductive side walls 72 are disposed in an insulating layer 2 across the optical waveguide 21 in approximately parallel with it as well as a conductive front wall 73 that avoids the optical waveguide 21 is formed vertically in connection to the conductive side walls. An opening 73a is formed to the conductive front wall 73 so that the optical waveguide 21 is passed therethrough. These conductive walls can be easily formed by continuously forming via holes by repeatedly using laser processing used to form the via holes for the conductive vias and filling the insides thereof with a conductive material. With this arrangement, the stray light 41 and the electromagnetic wave noise 42 which transmit in the insulating layer 2 are reflected by the conductive side walls 72 and the conductive front wall 73, and only signal light to be received reaches a light receiving device of a receiving portion 12.

Portions (a) and (b) of FIG. 4 are sectional views of a main portion of a third embodiment of the present invention, wherein the part (a) is a longitudinal sectional view, and the part (b) is a lateral sectional view on a plane passing through an optical waveguide. In an optically guiding portion 1a of an optoelectronic hybrid integrated module of the embodiment shown in FIG. 4, a light shield effect is enhanced not only by scattering carried out by conductive vias 71 but also by direct absorption or scattered light absorption carried out by via holes filled with a light absorbent (hereinafter, referred to as absorbent-filled vias) 74. The absorbent-filled vias 74 are disposed inside of the conductive vias 71 disposed in a C-shape so as to shut off the path of the stray light 4. With this arrangement, the stray light 41 that transmits in an insulating layer 2 is scattered by the conductive vias 71 and further absorbed by the absorbent-filled vias 74, thereby only signal light to be received reaches a light receiving device of a receiving portion 12. An absorbent material can be easily selected from polymer resins.

Portions (a) and (b) of FIG. 5 are sectional views of a main portion of a fourth embodiment of the present invention, wherein the part (a) is a longitudinal sectional view, and the part (b) is a lateral sectional view on a plane passing through the optical waveguide. In an optically guiding portion 1a of an optoelectronic hybrid integrated module of the embodiment shown in FIG. 5, an absorbing layer 75 composed of a light absorbent material is formed in the upper portion of an insulating layer 2, and a light shield effect is enhanced by scattering carried out by conductive vias 71 and direct absorption and scattered light absorption carried out by absorbent-filled vias 74 and the absorbing layer 75. The absorbent-filled vias 74 are disposed inside of the conductive vias 71 disposed in a C-shape so as to shut off the path of the stray light 41. With this arrangement, the stray light 41 which transmits in the insulating layer 2 is scattered by the conductive vias 71 and further absorbed by the absorbent-filled vias 74 and the absorbing layer 75, thereby only signal light to be received reaches a light receiving device of a receiving portion 12. Likewise, stray light 43 which has directly reached the absorbing layer 75 is absorbed as it is. An absorbent material can be easily selected from polymer resins, and the absorbing layer 75 can be formed by spin coating. Further, via holes passing through the absorbing layer 75 and the insulating layer 2 can be easily formed by laser processing.

Note that although the first to fourth embodiments explain the cases in which each one piece of the transmitting portion, the receiving portion, and the optical waveguide is provided, a plurality of the transmitting portions or the receiving portions may be disposed in an array state. Otherwise, a plurality of sets of the transmitting portions, the receiving portions, and the optical waveguides may be disposed in an array state. According to the present invention, even if they are arranged as the arrays, since the conductive vias and the like can be formed in a minute portion, a light and electromagnetic noise shield structure can be installed to each of the individual optical waveguides. As a result, it is possible to suppress crosstalk between adjacent channels even in an arrayed module integrated compactly.

Portions (a) to (c) of FIG. 6 are schematic views of an optoelectronic hybrid integrated module of a fifth embodiment of the present invention, wherein the part (a) is a longitudinal sectional view, and the part (b) is a top view, and the part (c) is a lateral sectional view when viewed on a plane passing through an optical waveguide. The optoelectronic hybrid integrated module 1 includes a transmitting portion 11, a receiving portion 12, and an optical waveguide 21 disposed in an insulating layer 2 and optically coupling between the transmitting portion 11 and the receiving portion 12, and they are disposed on an insulating layer 31 on a substrate 3 and arranged as an integrated module. An upper electrode/wiring 63 and a lower electrode/wiring 64 are formed on the upper and lower surfaces of the insulating layer 2, respectively, and further conductive vias 71 and absorbent-filled vias 74 are formed in the insulating layer 2. Here, each of the upper electrode/wiring 63 and the lower electrode/wiring 64 includes a ground electrode, a signal line, and a power supply line.

The transmitting portion 11 is composed of an LD 51 and a transmitting LSI 52. The LD 51 is flip-chip coupled with a signal line 69 formed on the insulating layer 31 and creates a light signal in response to a current amplitude signal from the transmitting LSI 52. The layer structure and the internal structure of the LD 51 are arranged as structures suitable for optical coupling with an optical waveguide. Further, the LD 51 is not limited to an edge-emitting LD and may be a face-emitting LD may be used. In this case, the face-emitting LD may be mounted on the insulating layer 2, a light path may be changed 90 by a mirror, and light therefrom may be coupled with the optical waveguide 21. The transmitting LSI 52 is flip-chip mounted on upper ground electrodes 62, a power supply line 68, and a signal line 65 through bumps 9 and supplies a drive current having a current amplitude necessary to the LD 51 in response to an electric signal from the outside (modulated signal of a prescribed voltage). The signal line 65, to which the transmitting LSI 52 is connected, and the signal line 69, to which the LD 51 is connected, are connected to each other by a conductive via formed passing through the insulating layer 2. The receiving portion 12 is composed of a receiving PD 53 and a receiving LSI 54. The receiving PD 53 is flip-chip connected to a signal line 66 on the insulating layer 2, converts input signal light into a current amplitude signal, and transmits it to the receiving LSI 54. The receiving PD 53 is not limited to a face-incident PD, and an edge-incident PD may be used. In this case, the PD may be mounted on the lower electrode/wiring 64 and directly coupled with the optical waveguide 21. The receiving LSI 54 is flip-chip connected to the upper ground electrodes 62, the signal line 66, and a power supply line 67 on the insulating layer 2 and converts the current amplitude signal from the receiving PD 53 into a voltage signal so that it has a prescribed voltage. The receiving portion 12 is accommodated in a metal shield case 76 connected to the upper ground electrode 62.

In the embodiment, although the signal line is arranged as a coplanar transmission line, it may be formed as a microstrip line on the upper ground electrode. With this arrangement, the stray light and the electromagnetic wave noise can be more completely shielded.

In the embodiment, the optical waveguide 21 is disposed on the substrate 3 in so as to be formed in a V-shape as an optical circuit portion. The transmitting portion is formed to one edge of the substrate 3, a WDM filter 55 is disposed to a portion of substrate 3 with which the optical waveguide intersects, and the receiving portion 12 is disposed behind it. One edge of the optical waveguide 21 opened to the V-shape is coupled with the LD 51 and the other edge thereof is coupled with an optical fiber 8.

The WDM filter 55 is inserted into a groove formed to a portion in which two optical waveguides intersect in the V-shape. The input light from the outside is reflected by a mirror 56 after it passes through the WDM filter 55 and is incident on the receiving PD 53. The signal light from the transmitting portion 11 is reflected by the WDM filter 55 and output to the outside through the optical fiber 8.

The optical fiber 8 guides the light input from the outside to the receiving portion 12 through the optical waveguide 21 and outputs it from the transmitting portion to the outside through the optical waveguide 21. The optical fiber 8 is positioned by a V-groove and the like formed on the substrate.

In the arrangement of the transmission/reception integrated optoelectronic hybrid integrated module arrangement, the insulating layer 2, in which the optical waveguide 21 is disposed to optically couple between the transmitting portion 11 and the receiving portion 12, has the upper ground electrode 62 and the lower ground electrode 61 formed on both the upper and lower surfaces on the transmitting portion side and the receiving portion thereof, and the conductive vias 71 and the absorbent-filled vias 74 are disposed to the transmitting portion side and the receiving portion side, respectively. Here, the conductive vias 71 are disposed to surround the optical waveguide 21 on both the transmitting portion side and the receiving portion side. Further, transmission of the space-transmitting electromagnetic wave noise, which is generated in the transmitting portion 11, to the receiving portion 12 is shut off by the shield case 76. That is, equi-potential planes are formed by the upper and lower ground electrodes 61, 62, the conductive vias 71, and the shield case 76, thereby respective space-transmitting, substrate-transmitting, and insulating-layer-transmitting electromagnetic wave noises can be shielded. In the embodiment, although the shield case 76 is disposed to the receiving portion 12 side which is liable to be affected by the electromagnetic wave noise from the outside, it may be disposed to the transmitting portion 11 side.

With the arrangement described above, since a light shield plate with a hole for reducing stray light becomes unnecessary in the embodiment of the present invention, a mounting cost can be reduced. Further, since the electromagnetic wave shield structure for reducing electromagnetic wave noise can be disposed in the vicinity of the transmission side or the reception side, it is not necessary to increase a distance between the transmission side and the reception side, thereby the hybrid integrated module can be reduced in size.

EXAMPLE 1

Next, an example 1 of the present invention will be explained referring to FIG. 6. An LD 51 was an edge-emitting device with an oscillation wavelength of 1310 nm, a receiving PD 53 was a face-receiving photodiode, and these optical devices were flip-chip mounted. An insulating layer 2 had an optical waveguide loss of 0.5 dB/cm. A transmitting LSI 52 controlled the implanted current of the LD 51 in response to the electric signal of a differential input of 156 Mbits/s from the outside. A light signal with a wavelength of 1310 nm was reflected by a WDM filter 55 through an optical waveguide 21 and optically output from an optical fiber 8 to the outside. In contrast, a light input with a wavelength of 1550 nm and 622 Mbits/s was transmitted through the optical fiber 8 and the optical waveguide 21, passed through the WDM filter 55, was reflected by a mirror 56, received by a receiving PD 53, and output by the receiving LSI 54 as an electric signal. At the time, isolation of the light from the LD 51 to the receiving PD 53 was 65 dB and isolation of electricity from the LD 51 to the receiving PD 53 was 80 dB, respectively, thereby an effect of reducing stray light and electromagnetic wave noise could be obtained.

INDUSTRIAL APPLICABILITY

As an example of use of the present invention, there can be exemplified an optoelectronic hybrid integrated module used in optical communications represented by local area networks, metropolitan area networks, and the like as well as used in optical links in and between servers and routers.

The invention claimed is:

1. An optoelectronic hybrid integrated module comprising a transmitting portion and/or a receiving portion and an optical waveguide disposed in an insulating layer and optically coupled with at least the transmitting portion or the receiving portion, characterized in that at least a part of the optical waveguide is surrounded by a conductive member that is formed cylindrically and grounded.

2. An optoelectronic hybrid integrated module comprising a transmitting portion and/or a receiving portion and an optical waveguide disposed in an insulating layer and optically coupled with at least the transmitting portion or the receiving portion, characterized in that:
   an upper ground electrode and a lower ground electrode are formed on the upper and lower surfaces of the insulating layer; and;
   at least a part of the optical waveguide is surrounded in a C-shape or a square shape by parallel conductive members connected to at least one of the upper ground electrode and the lower ground electrode and formed on both the sides of the optical waveguide along it and by intersecting conductive members formed in a direction in which they intersect the parallel conductive members.

3. An optoelectronic hybrid integrated module according to claim 2, characterized in that a ground electrode and a signal wiring are formed to at least one of the upper surface and the lower surface on the same layer.

4. An optoelectronic hybrid integrated module according to claim 2, characterized in that the parallel conductive members comprise trains of conductive vias or a conductive wall.

5. An optoelectronic hybrid integrated module according to claim 2, characterized in that the intersecting conductive member comprises trains of conductive vias or a conductive wall having an opening formed thereto through which the optical waveguide is passed.

6. An optoelectronic hybrid integrated module according to claim 1, characterized in that a reflecting member for reflecting optical and electromagnetic waves and/or a light absorbing member is further disposed in the insulating layer.

7. An optoelectronic hybrid integrated module according to claim 2, characterized in that a reflecting member for reflecting optical and electromagnetic waves and/or a light absorbing member is further disposed in the insulating layer.

8. An optoelectronic hybrid integrated module according to claim 7, characterized in that the reflecting member comprises grounded conductive vias formed passing through the insulating layer.

9. An optoelectronic hybrid integrated module according to claim 7, characterized in that the light absorbing member comprises an absorbent-filled vias comprising via holes passing through the insulating layer and filled with a light absorbent material.

10. An optoelectronic hybrid integrated module according to claim 1, characterized in that the transmitting portion comprises a light emitting device and a transmitting LSI for driving the light emitting device.

11. An optoelectronic hybrid integrated module according to claim 9, characterized in that the transmitting portion comprises a light emitting device and a transmitting LSI for driving the light emitting device.

12. An optoelectronic hybrid integrated module according to claim 11, characterized in that the transmitting LSI is mounted on the insulating layer.

13. An optoelectronic hybrid integrated module according to claim 1, characterized in that the receiving portion comprises a light receiving device and a receiving LSI for processing the output signal of the light receiving device.

14. An optoelectronic hybrid integrated module according to claim 12, characterized in that the light receiving portion comprises a light receiving device and a receiving LSI for processing the output signal of the light receiving device.

15. An optoelectronic hybrid integrated module according to claim 14, characterized in that the light receiving device and the receiving LSI are mounted on the insulating layer.

16. An optoelectronic hybrid integrated module according to claim 1, characterized in that at least one of the transmitting portion and the receiving portion is accommodated in a shield case.

17. An optoelectronic hybrid integrated module according to claim 15, characterized in that at least one of the transmitting portion and the receiving portion is accommodated in a shield case.

18. An optoelectronic hybrid integrated module according to claim 1, characterized in that an optical filter is interposed between the transmitting portion and the receiving portion to cause only any one of transmitted signal light and received signal light to pass therethrough.

19. An optoelectronic hybrid integrated module according to claim 17, characterized in that an optical filter is interposed between the transmitting portion and the receiving portion to cause only any one of transmitted signal light and received signal light to pass therethrough.

20. An optoelectronic hybrid integrated module according to claim 1, characterized in that a part of the insulating layer comprises a material for absorbing stray light.

21. An optoelectronic hybrid integrated module according to claim 19, characterized in that a part of the insulating layer comprises a stray light absorbing material.

22. An optoelectronic hybrid integrated module according to claim 1, characterized in that a plurality of the transmitting portions or a plurality of the receiving portions or a plurality of sets of the transmitting portions, the receiving portions, and the optical waveguides are disposed in array states.

23. An optoelectronic hybrid integrated module according to claim 21, characterized in that a plurality of the transmitting portions or a plurality of the receiving portions or a plurality of sets of the transmitting portions, the receiving portions and the optical waveguides are disposed in array states.

* * * * *